Patented Aug. 4, 1931

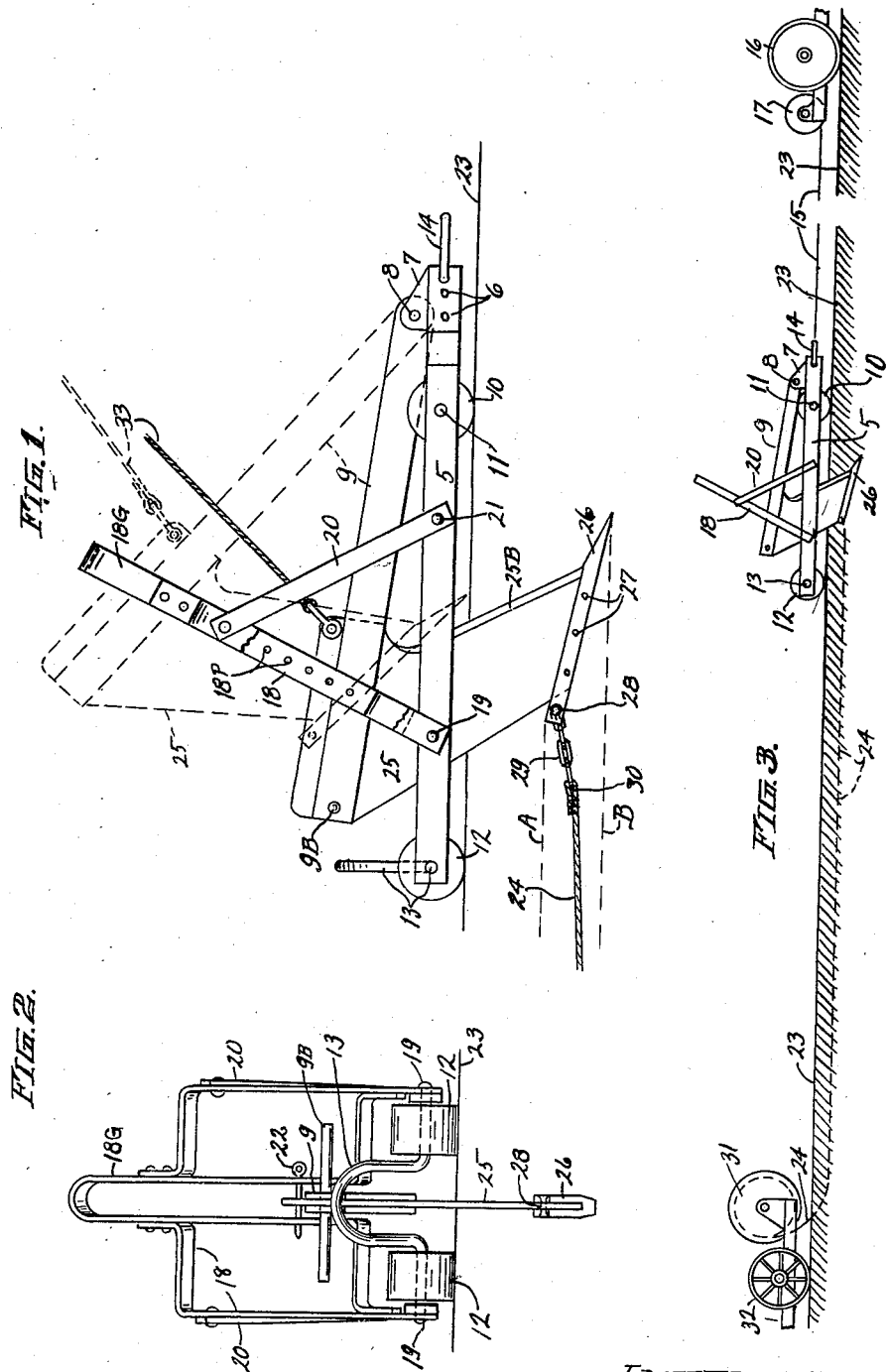

1,817,792

UNITED STATES PATENT OFFICE

CLEMENT A. YARES, OF ST. PAUL, MINNESOTA

CABLE LAYER

Application filed June 26, 1929. Serial No. 373,904.

My invention relates to cable laying devices in general and more specifically to a cable layer adapted for use in laying electric conductors a predetermined distance below the surface of the ground as for example along a road, boulevard, or drive where an insulated cable is to be laid for conducting current to a number of lights. The main object is to provide a simple, highly efficient and practical cable layer for purposes such as mentioned and the use of which results in a minimum of surface disturbances, as hereinafter fully set forth and as illustrated in the accompanying drawings, in which,—

Fig. 1 is a side elevation of my improved cable layer in operative position.

Fig. 2 is a rear end elevation of Fig. 1.

Fig. 3 is an assembly or operating view showing my device traveling in a straight line from a cable reel and toward a pulling device designated as a tractor.

Referring to the drawings by reference numerals, 5 designates an elongated horizontal main frame of two parallel bars except that they are brought toward each other forwardly and thence extended forward parallel. Between said latter ends is fixed at 6 a beam pivot plate 7 bored transversely as above said frame bars 5 to provide a pivot 8 for the front end of a plow beam 9 oscillatable on said pivot and in a vertical plane between the frame side bars 5. The frame is mounted on two pairs of small wheels or rollers of which the front ones are designated 10 mounted on a shaft 11 and the rear ones 12 mounted on a shaft 13 arched upwardly between its rollers for cable clearance.

14 represents any suitable type of draw member pivotally secured in the front end of the main frame and to which may be attached directly a tractor, or a cable 15 wound on a cable drum 17 of a tractor 16 or other suitable power plant (see Fig. 3).

18 is an upright forwardly inclined plow-beam guide frame mounted in transverse plane to the main frame and to said frame at 19, said frame being held in said inclined plane by suitable braces 20 fixed at 21 to the main frame side members. The center part of frame 18 comprises an inverted U-shaped guide 18G between the arms of which the plow beam 9 is oscillatable, and 18P are pairs of horizontally registering apertures in said guide arms for insertion of a gage pin 22 at selective heights to hold the plow beam down to a predetermined position as shown in full lines in Figs. 1 and 2.

23 designates the surface on which the device rolls and below which is to be laid a cable 24 at a predetermined depth.

The plow beam 9 comprises preferably two parallel bars between the rear parts of which is suitably fixed the upper part of a sod-shearing plate 25 in vertical plane, parallel to and between the side bars in the main frame, extending forwardly angularly and its forward edge preferably beveled to provide a cutting edge 25B. To the lower edge part of plate 25 is fixed at 27 a cable channel cutting member 26 comprising parallel bars fixed to both sides of the plate 25 and being solid or integral forward of the cutting edge 25B and tapered as shown, approximately.

Rearward of the plate 25 the bifurcated part of member 26 is drilled transversely for a pin 28 on which are engaged a chain 29 or other suitable means which latter in turn is also connected as at 30 to the cable 24 to be laid.

The path cutting member 26 is so mounted that its point is preferably further from the beam 9 than its rear part, therefore insuring that said bar is always in a forward and downwardly inclined position when moving along under the surface. Obviously the member 26 will thus make a path or tunnel through the soil under the surface, the said path being of course the width of bar 26 and a height as between the lines A and B of Fig. 1. The cable is drawn into said path as the device travels forward, being unwound from a cable reel 31 suitably mounted as on a truck 32 or other mounting means. When the required length of cable has thus been drawn into the ground the plow is raised by suitable tackle 33 or by pulling upward on a transverse bar 9B fixed in rear part of beam 9. During said movement of the device on the surface, from one point to another, it is obvious that the cutting edge 25B simply shears the surface leaving only a slit, the ground being in some cases slightly raised where the slit is cut but may readily be pressed down to normal level by any suitable roller (not shown).

When the soil cutting means are raised to inoperative position as shown dotted in Fig. 1, the front end of cable 24 is of course brought up through the surface and is accessible for connection to any arc-light or other street lighting means. When a considerable length of cable has been laid as described it may be tapped at any point for example to a series of electric street lights.

It will now be readily seen that with the use of my device street lighting cable may be laid rapidly and efficiently with no perceptible surface disturbance, leaving sod or graded surfaces in original condition. These advantages are obviously very important and desirable where cable is to be laid for example along a curb or between curbs in center boulevards of parkways.

Where surface conditions permit, a tractor 16 may be hitched directly at 14 to tow my device in its predetermined path. Otherwise the device may be drawn toward a stationary tractor 16 equipped with a cable drum 17 as shown to pull the device by means of the cable 15 up to the tractor.

In operation the upward pressure on beam 9 is always considerable but limited by the gage pin 22. However, an operator usually rides on the device and may stand on the cross bar member 9B of the beam to hold the plow to its proper depth and relieve upward strain on the gage pin.

I claim:

In a cable layer of the class described having a main wheel supported elongated frame with draft means at its front central part, a plow beam pivotally secured in proximity to said draft means and oscillatable in a vertical plane within said frame, an auxiliary frame mounted upright on the main frame intermediate its ends and an inverted U-shaped guide in said auxiliary frame in which the plow beam is guided; said plow comprising a soil shearing plate fixed in the beam and extending downwardly therefrom, the front edge of said plate comprising a cutting edge, a subsoil path cutter for a cable comprising a forwardly directed tapered bar fixed to the lower edge portion of said shearing plate and extending rearwardly of the said plate and means on said rear end for connecting a cable thereto, and said beam guide of the upright auxiliary plane provided with pairs of horizontally registering holes in its arms arranged linearly in each arm, and a gage pin insertible in said holes at selective heights and above the plow beam for the purpose described.

In testimony whereof I affix my signature.

CLEMENT A. YARES.